May 11, 1965 G. MOZZI ETAL 3,182,708
LIQUID FUEL COMBUSTION CHAMBER WITH AIR NOZZLES
IN WALLS AT DIVERSE ANGLES
Filed Nov. 21, 1962 2 Sheets-Sheet 1
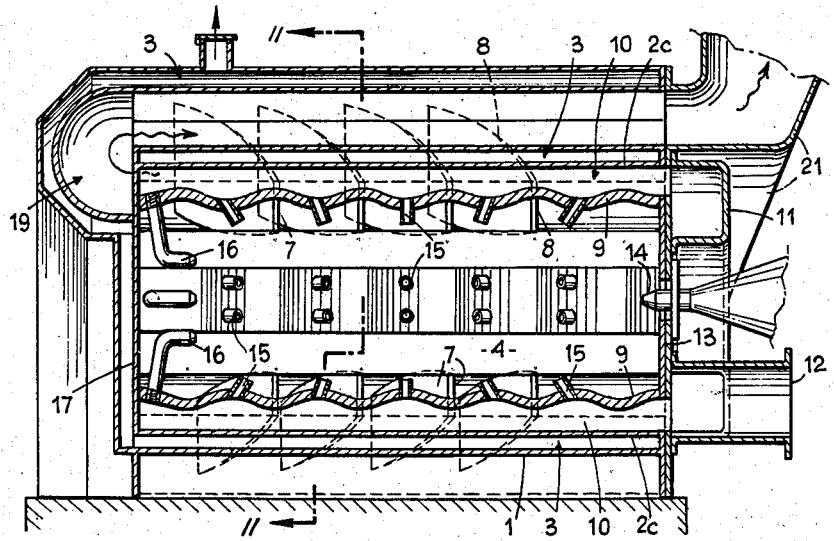
Fig. 1
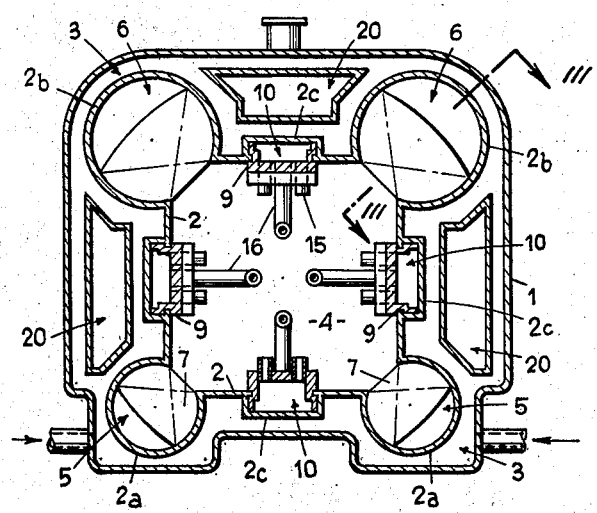
Fig. 2
Fig. 3
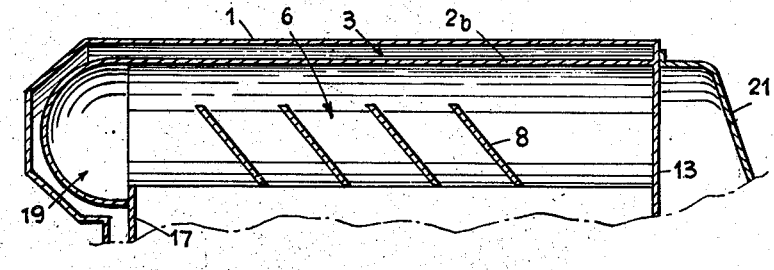

United States Patent Office 3,182,708
Patented May 11, 1965

3,182,708
LIQUID FUEL COMBUSTION CHAMBER WITH AIR NOZZLES IN WALLS AT DIVERSE ANGLES
Gianmario Mozzi, Via L. Da Vinci 179, and Carlo Puccinelli, Via Rosmini 35, both of Viareggio, Lucca, Italy
Filed Nov. 21, 1962, Ser. No. 239,259
Claims priority, application Italy, Nov. 27, 1961, 21,970/61
6 Claims. (Cl. 158—4)

The invention relates to a mixing system of combustion supporting air with fluid fuel, that is, liquid fuel, previously atomized or gaseous. Said system has been designed with the exact purpose of determining better and improved oxidation conditions and therefore a more efficient combustion in hot water or steam boilers for buildings heating, but it has also application in industrial uses. Characteristic of this system is also the absence of noisiness.

The oxidation system according to the invention substantially provides means whereby the combustion air is blown in on the fuel jet in directions different from the direction in which the fractionated liquid fuel is projected into the combustion chamber.

More particularly, according to the invention, air is blown in from walls of the combustion chamber which are inclined or substantially orthogonal to the wall from which the fuel is projected.

There may also be provided means for blowing air in a direction opposite to that in which the fuel is projected, from the end of the combustion chamber opposite that end from which the fuel is projected.

In order to prevent the escape of more volatile substances of the fuel unburnt from the reaction zone, and in order to improve the combustion, the combustion chamber and its associated nozzles are constructed and arranged in such a manner that the entire volume of the reactant gases is surrounded by streams of injected air.

The air injection nozzles laterally arranged with respect to the fuel jet may also have several inclinations to direct the injected air towards the center of the reaction zone.

In one embodiment of a combustion chamber according to the invention, air channels or conduits are provided along the combustion chamber walls, along which air conduits the air is heated and from which conduits the air is blown into the combustion chamber through nozzles formed in the walls of the same channels or conduits towards the combustion chamber. The conduits may extend parallel to the projection direction; from the end thereof opposite to the wall from which fuel is projected, projecting nozzles may be extended to blow in air in a direction parallel and opposite to the fuel projection direction.

Air may be blown in, as it is urged by a simple fan, such as an electric blower or fan.

The present oxidation system differs from the conventional one above all for the following reasons:

(a) Air required for the combustion is not forced into the interior of the combustion chamber by the burner or parallel to the fuel jet, but on the contrary, it is supplied from a separate source and in angular opposed relation to the fuel supply;

(b) The combustion supporting air, in the interior of the combustion chamber, may be arranged in trajectories, inclined with respect to the jet direction; in particular, air may form a "crossed" stream (i.e. having an angle of approx. 90°), with the direction of the jet or also be urged on the latter in a counter-current manner;

(c) Combustion supporting air may be pre-heated without having to recur to any auxiliary circuit; said air in fact during the travel leading it from its entrance to the chamber inlet orifices, contacting the conduits hot walls, and being heated to thus increase its temperature;

(d) A simple nozzle may be adopted for the atomization of fuel, as there exists no necessity of creating in the jet any turbulent and whirlwind motions designed to increase the mixing, although an intimate mixing of the air particles with the fuel droplets is assured; said mixing forming the first condition to obtain a complete and efficient combustion;

(e) Air in crossed currents or streams flowing countercurrent to the fuel jet, and having with respect to the latter a relative speed higher than that which it would have if the two streams of air and fuel originated from the same wall, has also the property of further atomizing the fuel droplets for a quicker evaporation of the liquid fuel.

For all the above stated reasons, the present system gives hotter flames, making use of a smaller excess of air with respect to the stoichiometric quantity and also assuring the silent operation of combustion and a total absence of smoke, soot and unburnt gases.

The drawings illustrate some embodiments of boilers constructed in accordance with the instant invention. In the drawing:

FIGS. 1, 2 and 3 illustrate, respectively, a boiler in longitudinal section, in transverse section according to the line II—II of FIG. 1 and in a fragmentary inclined section taken along the line III—III of FIG. 2;

Figure 4:
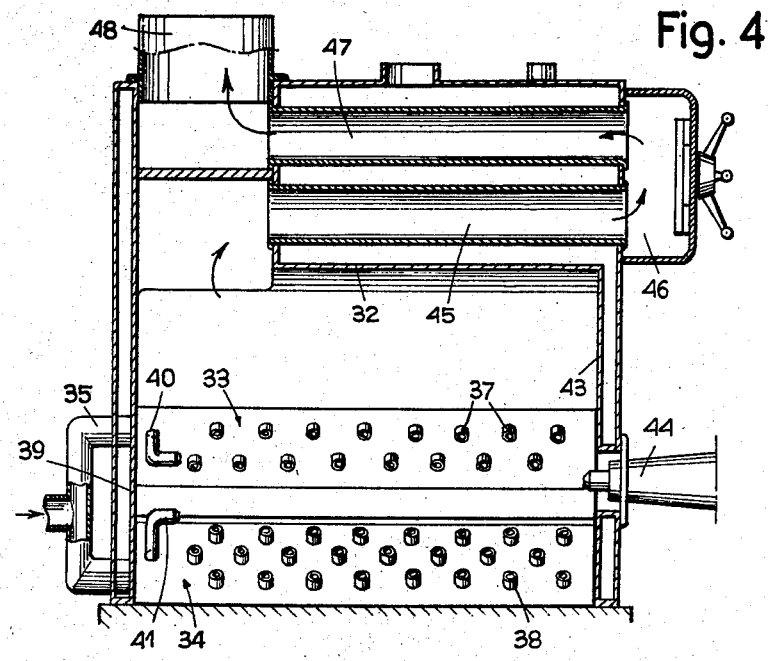
FIGS. 4 and 5 illustrate a second embodiment of the boiler in longitudinal section and in transverse section, respectively.

According to FIGS. 1 to 3, the boiler includes an outer casing 1 and an inner wall 2, which defines a water jacket 3. The walls 1 and 2 are shaped, and in particular, the wall 2 defines a combustion chamber, that is a central reaction chamber 4, having a substantially square cross-section and being horizontally developed; moreover, the wall 2 forms lower lobes 2a and upper lobes 2b, which define exit channels or conduits for the combustion products, indicated respectively at 5 and 6. In said channels or conduits deflection baffles 7 and 8 respectively are extended, and are inclined, to orient exhaust of the gases; the conduits 5 and 6 communicate with the combustion chamber 4 along the longitudinal corners thereof. The combustion chamber 4 is provided with recessed shaping 2c in an intermediate position of the walls 2, in correspondence to which shaping there is applied on each side of the combustion chamber 2, an element 9 forming an undulated wall, clearly visible in FIG. 1. The shapings 2c and the elements 9 form longitudinal channels or conduits 10. In said conduits air is blown in by means of a manifold 11; the air being supplied from a mouth 12 by an electric fan or the like. The manifold 11 is located in front of the front wall 13, which defines one of the ends of the combustion chamber 4. The nozzle 14 is extended through said wall and forms a jet for fractionated fuel only, and said jet is directed axially and thus horizontally into the combustion chamber 4. The conduits 10 blow the air into the combustion chamber 4 through nozzles 15 carried by the undulated walls 9 and differently inclined to be oriented towards the central zone of the combustion chamber 4. At the end of the conduits 10, opposite the manifold 11, the walls 9 carry nozzles 16 which are extended in the rear of the combustion chamber adjacent to the rear wall 17 opposite the wall 13; said nozzles 16 are oriented parallel to the axis of the jet formed by the nozzle 14 of the fuel, but in a direction opposite to the direction of said jet.

Through this main arrangement air is projected in a direction different from that of the fuel from nozzle 14. The air being projected from the walls of the combustion chamber but not from the wall 13 bearing said nozzle 14. The advantages are consequently as above stated. Air is heated passing through and along said channel or conduits 10.

The products of the combustion from the combustion chamber 4 pass into the exhaust channels or conduits 5 and 6, being oriented by the baffles 8 in a direction towards the left hand side looking at FIGS. 1 and 3. The combustion products may be directly discharged after the transit in the channels or conduits 5 and 6. Alternatively, the combustion products may be withdrawn through a tortuous path, as by means of manifolds 19 formed on the outside of the end wall 17, from which the combustion products are conveyed into the smoke conduits 20, which are surrounded by water jackets 3. A manifold for the smoke discharge to the outside of the wall 13 is indicated at 21.

Figure 5:
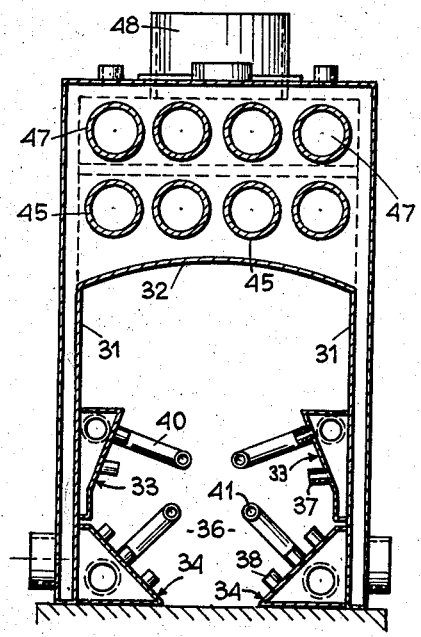

According to the FIGS. 4 and 5, vertical walls 31, which define the internal wall of a water jacket, together with an upper dome wall 32, define a combustion chamber; in the lower portion thereof four symmetrical air conduits respectively upper 33 and lower 34, are arranged and are supplied by air blown in by an electric fan through a manifold 35. The walls of the conduits 33 and 34 are turned towards the reaction chamber 36, forming the lower portion of the combustion chamber, and are provided with nozzles 37 and 38 respectively, oriented towards said chamber 36. Adjacent the rear wall 39 of the combustion chamber, nozzles 40 and 41 respectively are extended from the conduits 33 and 34, which nozzles project from the walls of said conduits and are oriented in an axial horizontal direction towards the front wall 43 of the combustion chamber. Through said wall 43 the nozzle 44 is extended and said nozzle forms a fractionated fuel jet in a direction parallel to but opposite to that of the nozzles 40 and 41.

The combustion products emerge out of the upper and rear end of the combustion chamber, to transit through a series of lower smoke tubes 45 to a front manifold 46; therefrom the combustion products pass within a series of upper smoke tubes 47 to reach the chimney 48.

The operation of this boiler is substantially equivalent to that of the boiler of the previous embodiment.

The drawn embodiments are not to be considered as limitative of the invention, which is defined by the following claims.

What we claim is:
1. Apparatus for the combustion of fluid fuel comprising, in combination, a longitudinally elongated combustion chamber including substantially parallel front and rear walls and substantially parallel bottom, top and side walls, a mechanical fuel injector extending into said combustion chamber through said front wall for projecting atomized liquid fuel along the longitudinal axis of the combustion chamber, means forming air channels extending along the top, bottom and side walls of the combustion chamber, a plurality of tubular air nozzles projecting from said channels into said combustion chamber, the nozzles adjacent said front wall being inclined inwardly and rearwardly, with the nozzles nearest said front wall having a greater rearward inclination than those nozzles farther from the front wall, the nozzles at the center of the chamber being substantially perpendicular to the longitudinal axis thereof and the nozzles adjacent the rear wall being forwardly and inwardly inclined, with the nozzles nearest the rear wall having a greater forward inclination than those more remote therefrom, said nozzles adjacent said front wall being spaced from said injector initially to oxidize the fuel at a distance therefrom, additional nozzles immediately adjacent said rear wall extending substantially parallel to the longitudinal axis of the combustion chamber, and means for supplying air under pressure to said air channels.

2. The structure of claim 1 wherein means are provided for exhausing the products of combustion from said combustion chamber.

3. The structure of claim 2 wherein the means for exhausting the products of combustion include means defining additional channels defining smoke conduits extending longitudinally of the combustion chamber and communicating therewith.

4. The structure of claim 3 wherein the means for exhausting the products of combustion further include means defining an exhaust manifold extending parallel to the smoke conduits and communicating therewith, said exhaust manifold communicating with a discharge stack, and inclined transverse fins are provided in said exhaust manifold.

5. The structure of claim 4 wherein cooling water jackets surround said smoke conduits.

6. The structure of claim 1 wherein undulant baffles define the inner walls of the air channels and extend along said side, top and bottom walls of said combustion chamber, and said first mentioned nozzles project therethrough.

References Cited by the Examiner
UNITED STATES PATENTS

| | | | |
|---|---|---|---|
| 1,386,608 | 8/21 | Du Pont | 158—73 |
| 1,601,909 | 10/26 | Drake et al. | 110—75 |
| 1,751,534 | 3/30 | Taylor | 158—4 |
| 2,923,348 | 2/60 | Frazer | 158—4 |

FOREIGN PATENTS

| | | |
|---|---|---|
| 387,751 | 2/33 | Great Britain. |
| 412,225 | 6/34 | Great Britain. |

JAMES W. WESTHAVER, *Primary Examiner.*

MEYER PERLIN, *Examiner.*